United States Patent Office 3,662,065
Patented May 9, 1972

3,662,065
CHLORO SUBSTITUTED BENZYL TRIPHENYL PHOSPHONIUM HALIDES AS ANTHELMINTICS
Robert J. Balske, Creve Coeur, Mo., assignor to Monsanto Company, St. Louis, Mo.
No Drawing. Filed Feb. 9, 1970, Ser. No. 9,950
Int. Cl. A61k 27/00; A01n 9/36
U.S. Cl. 424—198          7 Claims

ABSTRACT OF THE DISCLOSURE

Usage of chloro substituted benzyl triphenylphosphonium halides for combating helminthiasis in animals.

---

This invention relates to the anthelmintic usage of chloro substituted benzyl triphenylphosphonium halides of the formula

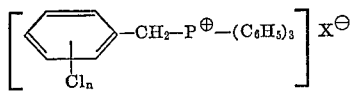

wherein $n$ is a whole number from 1 to 3, inclusive, but preferably 2, and wherein X is halogen of atomic weight in the range of 35 to 127, inclusive, that is chloro, bromo or iodo, but preferably chloro. It is particularly preferable that the chloro substituted benzyl moiety be 2,4-dichlorobenzyl.

These anthelmintics are prepared by reacting equimolecular proportions of triphenylphosphine, $(C_6H_5)_3P$, and the appropriate chloro substituted benzyl halide of the formula

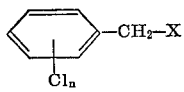

wherein $n$ and X have the aforedescribed significances in the presence of an inert organic solvent. For example, white solid (2,4-dichlorobenzyl) triphenylphosphonium chloride

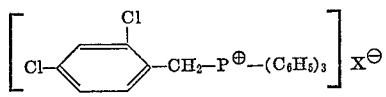

is prepared by refluxing in benzene equimolecular proportions of triphenylphosphine and 2,4-dichlorobenzyl chloride (J. Org. Chem., vol. 27, p. 1057, March 1962). In like manner the following generally high melting solids are prepared (2,4-dichlorobenzyl) triphenylphosphonium bromide
(2,4-dichlorobenzyl) triphenylphosphonium iodide
(3,4-dichlorobenzyl) triphenylphosphonium chloride
(3,4-dichlorobenzyl) triphenylphosphonium bromide
(2,6-dichlorobenzyl) triphenylphosphonium chloride
(2,5-dichlorobenzyl) triphenylphosphonium iodide
(2,4,5-trichlorobenzyl) triphenylphosphonium chloride
(2,4,6-trichlorobenzyl) triphenylphosphonium chloride
(4-chlorobenzyl) triphenylphosphonium chloride
(4-chlorobenzyl) triphenylphosphonium iodide
(2-chlorobenzyl) triphenylphosphonium chloride, etc.

from triphenylphosphine and the appropriate chloro substituted benzyl halide.

These chloro substituted benzyl triphenylphosphonium halides are anthelmintics, that is they are useful in combating helminthiasis in animals susceptible to or suffering from an infestation in their gastrointestinal tract with parasitic worms of the phyla Nematheminthes and Platyhelminthes, the member species of which phyla are generally termed helminths. Parasitic worms of the phylum Platyhelminthes which infest the digestive systems of animals include tapeworm species of the class Cestoidea and fluke species of the class Trematoda, which parasitic worms are often termed flatworms, a particularly injurious helminth species being Taenia saginata. Parasitic worms of the phylum Nemathelminthes which infest the digestive systems of animals include round worms of the class Nematoda, particularly such species as Ascaris suum, Syphacea obvelata and the economically important Haemonchus contortus of ruminants. This invention is particularly concerned with combating this latter helminth species amongst others of the phylum Nemathelminthes in ruminants.

The term "animal" as employed herein and in the appended claims includes, for example, the ruminants such as deer, goats, sheep and cattle, the monogastrics such as swine, rabbits, dogs, cats, and hamsters, poultry such as chickens, turkeys, geese, ducks, guinea fowl, pigeons and pheasants and birds such as parrots, canaries, parakeets, and the like, which are susceptible to helminthiasis.

The method of combatting helminthiasis in an animal in accordance with this invention involves contacting the helminth in the body of the animal by administering thereto an anthelmintically effective amount of a chloro substituted benzyl triphenylphosphonium halide aforedescribed. These compounds are somewhat soluble in organic solvents and are adapted to be administered to animals. The compounds can be employed in admixture with grain rations or animal feeds. They can be administered continuously or intermittently in dosages sufficient to protect the animal from the attack of helminthes without in any way causing detriment to the animal.

The administration or feeding of an effective dosage of at least one of the compounds to be employed according to the present invention is essential and critical for the practice of this invention. The amount of one or more of the compounds which will constitute an effective anthelmintic dosage varies considerably and is dependent upon such factors as the animal concerned, the age of the animal, the helminth against which protection is sought, the life state of such organism against which protection is sought, the prticular compound employed, and the like. In general, good results are obtained when there is administered to animal a dose of from 0.01 to 1,000 milligrams of one of the compounds per kilogram of body weight and preferably from 0.01 to 500 milligrams per kilogram of body weight. Where the compound is administered on a daily schedule, good results there is administered to animal a dosage of from 0.01 to 150 milligrams or more of one of the compounds per kilogram of animal body weight. Where helminth control is the main objective of treatment and the danger of reexposure to the attack of intestinal parasites from contaminated feed or surroundings is low, good results are obtained when there is administered to an animal a daily dosage of from 0.5 to 50 milligrams or more per kilogram of body weight. Where such danger of reexposure is very low, good results are frequently obtained when an animal is dosed on a single occasion with from 2.5 to 1000 milligrams of one of the compounds per kilogram of body weight.

The method of the present invention can be carried out by administration or feeding of the compounds per se of this invention. However, the present invention embraces the employment of any liquid, powder, mash, drench, bolus, pellet, capsule or other animal food containing one or more of these componds. In such usage, the compounds of this invention can be modified with one or more of a plurality of additaments or innocuous ingestible adjuvants including water, ethanol, skim milk, edible oils, propylene glycol, syrups, grain rations, surface active dispersing agents such as the liquid and solid emulsifying agents, and edible solid carriers such as edible powders and commercial animal feeds, concentrates or supplements. By "commercial animal feeds, concentrates or supplements" are meant the partial and complete animal feeds containing desirable amounts of minerals, vitamins, antioxidants, antibiotics and growth stimulants. In such animal feed compositions, the adjuvant cooperates with the active agent so as to facilitate the invention and obtain an improved result. Further, the compositions are adapted to be fed to animals to supply the desired dosage of active agent, or to be employed as concentrates and subsequently diluted with additional carrier or adjuvant to produce the ultimate compositions.

The active material of this invention can also be dispersed, with or without vitamin, mineral, or other feed supplements, upon a material, such as spaghnum moss, which serves as an edible mechanical support or roughage. The resulting treated material is employed as, or in addition to other, animal feed, or supplied to young nursing animals not yet feeding on the feed ration normally fed to the adult animals.

The exact concentration of the compounds of this invention to be employed in the compositions can vary provided that enough of the composition is ingested by the animal so as to provide the required internal anthelmintic amount of active ingredients. For examples, where direct administration to the individual animal is preferred, liquid or solid compositions containing from 0.5 to 98 percent by weight of one or more of the agents conveniently are employed to supply the desired dosage. Representative of this type of composition is the relatively concentrated composition containing one of the active agents and nutritive supplementary materials, which composition is provided for the ad libitum consumption by animals, that is, a "salt-block" type of composition. Also representative of such compositions is a slow-release type of composition containing one of the active agents in the form of small pellets or granules which are administered orally and which lodge internally and release their contents over an extended period of time. Where one or more of the compounds is provided as a constituent of the principal food or water ration, satisfactory results are obtained with rations containing a minor but effective amount of the compounds. The exact amounts of the compounds in the ration or drinking water are dependent upon the food and water consumption and feeding and watering habits of the animal concerned. In animal feeds, the required dosage can be supplied with feeds containing at least 0.0001 percent or more and usually from 0.0001 to 0.5 percent by weight of active material. When fed as the principal food ration, the required dosage is conveniently supplied with feeds containing from 0.0001 to 0.3 percent by weight of active material.

As illustrative of this invention but not limitative thereof is the following:

The anthelmintic activity of these chloro substituted benzyl triphenylphosphonium halides is illustrated by the following method in which the reduction in fecal egg count was used as the criteria for reduction of the parasite burden. Three male sheep were equally infested with larvae of *Haemonchus contortus*. The sheep faeces were examined at intervals for eggs of *Haemonchus contortus* to insure that infestation had occurred. Approximately thirty-six (36) days after this infestation two of these sheep were respectively dosed with (2,4-dichlorobenzyl) triphenylphosphonium chloride at a rate of 100 mg. per kg. of body weight. The third untreated sheep served as a control to confirm that *Haemonchus contortus* eggs were continually produced throughout the evaluation period. Reduction in fecal eggs was determined by counting the number of eggs per gram of sheep faeces passed six days immediately following said dosing and then comparing the average number of eggs per gram of faeces passed from the two treated sheep to the average number of eggs per gram of faeces said two sheep passed on the day of their dosing. The average reduction in egg count from the two treated sheep was 96 percent. Employing the same procedure but employing (2,4-dichlorobenzyl) triphenylphosphonium chloride at a rate of 75 mg. per kg. of body weight the same results were obtained.

While this invention has been described with respect to certain embodiments it is to be understood that it is not so limited and that variations and modification thereof obvious to those skilled in the art can be made without departing from the spirit or scope of this invention.

What is claimed is:

1. A method of combating helminthiasis in an animal susceptible to helminthiasis which comprises orally administering to said animal an athelmintically effective amount of a chloro substituted benzyl triphenylphosphonium halide of the formula

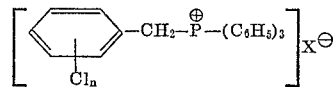

wherein *n* is a whole number from 1 to 3, inclusive, and wherein X is halogen of atomic weight in the range of 35 to 127, inclusive.

2. A method in accordance with claim 1 wherein *n* is 2.

3. A method of claim 1 wherein the animal is a ruminant.

4. A method in accordance with claim 2 wherein the dichlorobenzyl moiety is 2,4-dichlorobenzyl.

5. A method in accordance with claim 4 wherein X is chloro.

6. A method in accordance with claim 4 wherein the helminth combated is a species of the phylum Nemathelminthes.

7. A method in accordance with claim 5 wherein the helminth combated is the species *Haemonchus contortus*.

References Cited

FOREIGN PATENTS 22,600  9/1929  Australia _____ 424—198

OTHER REFERENCES

Keaveney et al., J. Org. Chem. vol. 27 (1962), p. 1057.

ALBERT T. MEYERS, Primary Examiner

V. D. TURNER, Assistant Examiner